US012664602B2

(12) United States Patent
Aravamudhan et al.

(10) Patent No.: US 12,664,602 B2
(45) Date of Patent: Jun. 23, 2026

(54) LOW-LATENCY VIDEO MATTING

(71) Applicant: Apple Inc., Cupertino, CA (US)

(72) Inventors: Srinidhi Aravamudhan, San Jose, CA (US); Adrian P. Lindberg, Karlstad, CA (US); Eshan Verma, Hayward, CA (US); Jaya Vijetha Gattupalli, San Jose, CA (US); Mingshan Wang, Mountain View, CA (US); Ranjit Desai, Cupertino, CA (US); Vinay Palakkode, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 145 days.

(21) Appl. No.: 18/469,984

(22) Filed: Sep. 19, 2023

(65) Prior Publication Data

US 2024/0104686 A1     Mar. 28, 2024

Related U.S. Application Data

(60) Provisional application No. 63/376,923, filed on Sep. 23, 2022.

(51) Int. Cl.
G06T 7/194 (2017.01)
G06T 1/20 (2006.01)
(Continued)

(52) U.S. Cl.
CPC .................. G06T 1/20 (2013.01); G06T 3/40 (2013.01); G06T 7/11 (2017.01); G06T 7/194 (2017.01);
(Continued)

(58) Field of Classification Search
CPC ............. G06T 7/11; G06T 2207/20081; G06T 2207/20084; G06T 7/194;
(Continued)

(56) References Cited

U.S. PATENT DOCUMENTS

| | | | | | |
|---|---|---|---|---|---|
| 11,004,208 B2 | * | 5/2021 | Price | ......................... | G06T 7/11 |
| 11,525,906 B2 | * | 12/2022 | Kadambi | ................ | G06T 7/593 |

(Continued)

FOREIGN PATENT DOCUMENTS

| | | | | | | |
|---|---|---|---|---|---|---|
| CN | 118302791 A | * | 7/2024 | ............. | G06N 20/20 |
| WO | WO-2022231582 A1 | * | 11/2022 | ............. | H04N 5/272 |

*Primary Examiner* — Chante E Harrison
(74) *Attorney, Agent, or Firm* — Blank Rome LLP

(57) ABSTRACT

Techniques are disclosed herein for implementing a novel, low latency, guidance map-free video matting system, e.g., for use in extended reality (XR) platforms. The techniques may be designed to work with low resolution auxiliary inputs (e.g., binary segmentation masks) and to generate alpha mattes (e.g., alpha mattes configured to segment out any object(s) of interest, such as human hands, from a captured image) in near real-time and in a computationally efficient manner. Further, in a domain-specific setting, the system can function on a captured image stream alone, i.e., it would not require any auxiliary inputs, thereby reducing computational costs—without compromising on visual quality and user comfort. Once an alpha matte has been generated, various alpha-aware graphical processing operations may be performed on the captured images according to the generated alpha mattes (e.g., background replacement operations, synthetic shallow depth of field (SDOF) rendering operations, and/or various XR environment rendering operations).

20 Claims, 9 Drawing Sheets

(51) Int. Cl.
   *G06T 3/40*        (2024.01)
   *G06T 7/11*        (2017.01)

(52) U.S. Cl.
   CPC ............... *G06T 2207/10016* (2013.01); *G06T 2207/20081* (2013.01); *G06T 2207/20084* (2013.01)

(58) Field of Classification Search
   CPC ........... G06T 2207/10016; G06T 5/00; G06V 40/162; H04N 7/0117; H04N 5/2226; G06N 3/0464
   See application file for complete search history.

(56) References Cited

U.S. PATENT DOCUMENTS

| | | | |
|---|---|---|---|
| 11,593,948 B2 * | 2/2023 | Yu | G06T 7/11 |
| 11,637,998 B1 * | 4/2023 | Pieper | H04N 9/7973 348/207.99 |
| 11,978,181 B1 * | 5/2024 | Pieper | G06T 5/92 |
| 2023/0135978 A1 * | 5/2023 | Price | G06N 3/09 382/232 |
| 2023/0342991 A1 * | 10/2023 | Oh | G06T 11/10 |
| 2024/0212098 A1 * | 6/2024 | Pourian | G06T 7/11 |
| 2024/0296612 A1 * | 9/2024 | Rhodes | G06T 13/40 |

* cited by examiner

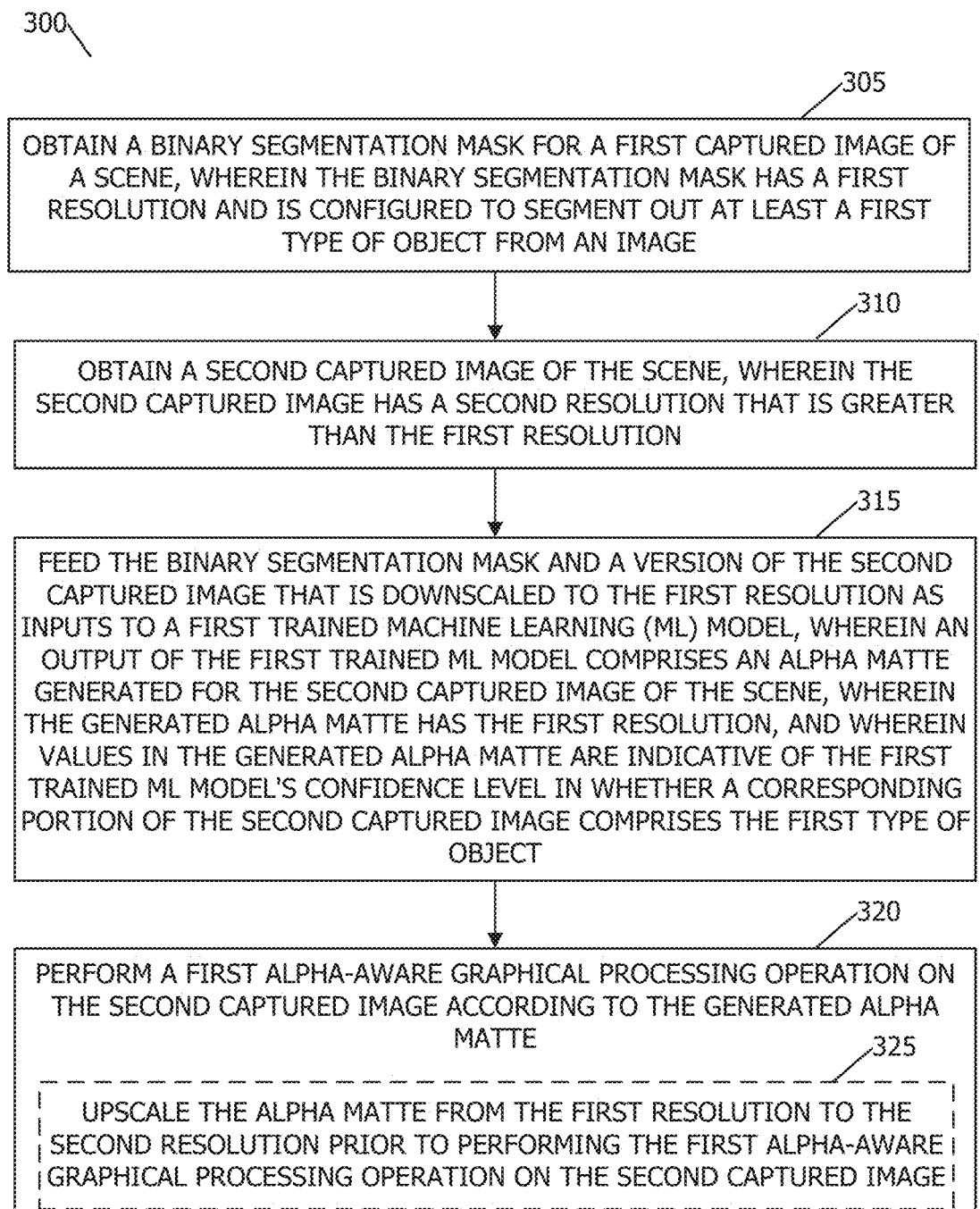

300

305

OBTAIN A BINARY SEGMENTATION MASK FOR A FIRST CAPTURED IMAGE OF A SCENE, WHEREIN THE BINARY SEGMENTATION MASK HAS A FIRST RESOLUTION AND IS CONFIGURED TO SEGMENT OUT AT LEAST A FIRST TYPE OF OBJECT FROM AN IMAGE

310

OBTAIN A SECOND CAPTURED IMAGE OF THE SCENE, WHEREIN THE SECOND CAPTURED IMAGE HAS A SECOND RESOLUTION THAT IS GREATER THAN THE FIRST RESOLUTION

315

FEED THE BINARY SEGMENTATION MASK AND A VERSION OF THE SECOND CAPTURED IMAGE THAT IS DOWNSCALED TO THE FIRST RESOLUTION AS INPUTS TO A FIRST TRAINED MACHINE LEARNING (ML) MODEL, WHEREIN AN OUTPUT OF THE FIRST TRAINED ML MODEL COMPRISES AN ALPHA MATTE GENERATED FOR THE SECOND CAPTURED IMAGE OF THE SCENE, WHEREIN THE GENERATED ALPHA MATTE HAS THE FIRST RESOLUTION, AND WHEREIN VALUES IN THE GENERATED ALPHA MATTE ARE INDICATIVE OF THE FIRST TRAINED ML MODEL'S CONFIDENCE LEVEL IN WHETHER A CORRESPONDING PORTION OF THE SECOND CAPTURED IMAGE COMPRISES THE FIRST TYPE OF OBJECT

320

PERFORM A FIRST ALPHA-AWARE GRAPHICAL PROCESSING OPERATION ON THE SECOND CAPTURED IMAGE ACCORDING TO THE GENERATED ALPHA MATTE

325

UPSCALE THE ALPHA MATTE FROM THE FIRST RESOLUTION TO THE SECOND RESOLUTION PRIOR TO PERFORMING THE FIRST ALPHA-AWARE GRAPHICAL PROCESSING OPERATION ON THE SECOND CAPTURED IMAGE

*FIG. 3A*

330

335

OBTAIN A FIRST CAPTURED IMAGE OF A SCENE, WHEREIN THE FIRST
CAPTURED IMAGE HAS A FIRST RESOLUTION

340

FEED A VERSION OF THE FIRST CAPTURED IMAGE THAT IS DOWNSCALED
TO A SECOND RESOLUTION AS INPUT TO A FIRST DOMAIN-SPECIFIC
TRAINED MACHINE LEARNING (ML) MODEL, WHEREIN AN OUTPUT OF THE
FIRST DOMAIN-SPECIFIC TRAINED ML MODEL COMPRISES AN ALPHA MATTE
GENERATED FOR THE FIRST CAPTURED IMAGE OF THE SCENE, WHEREIN
THE GENERATED ALPHA MATTE HAS THE SECOND RESOLUTION, AND
WHEREIN VALUES IN THE GENERATED ALPHA MATTE ARE INDICATIVE OF
THE FIRST DOMAIN-SPECIFIC TRAINED ML MODEL'S CONFIDENCE LEVEL IN
WHETHER A CORRESPONDING PORTION OF THE FIRST CAPTURED IMAGE
COMPRISES AN OBJECT FROM THE SPECIFIC DOMAIN THAT THE FIRST
DOMAIN-SPECIFIC TRAINED ML MODEL IS TRAINED TO RECOGNIZE

345

PERFORM A FIRST ALPHA-AWARE GRAPHICAL PROCESSING OPERATION ON
THE SECOND CAPTURED IMAGE ACCORDING TO THE GENERATED ALPHA
MATTE

350

UPSCALE THE ALPHA MATTE FROM THE FIRST RESOLUTION TO THE
SECOND RESOLUTION PRIOR TO PERFORMING THE FIRST ALPHA-AWARE
GRAPHICAL PROCESSING OPERATION ON THE SECOND CAPTURED IMAGE

*FIG. 3B*

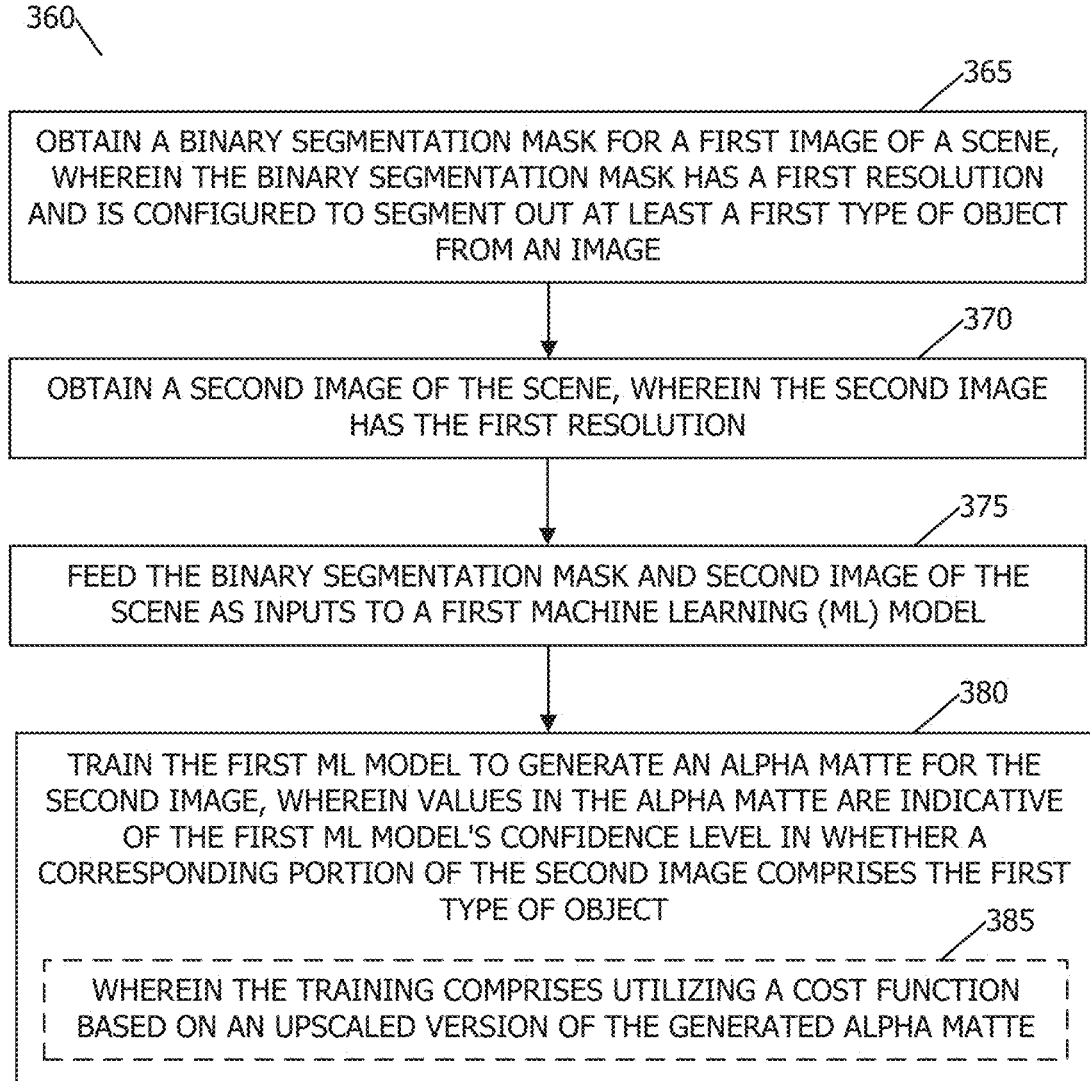

360

365
OBTAIN A BINARY SEGMENTATION MASK FOR A FIRST IMAGE OF A SCENE, WHEREIN THE BINARY SEGMENTATION MASK HAS A FIRST RESOLUTION AND IS CONFIGURED TO SEGMENT OUT AT LEAST A FIRST TYPE OF OBJECT FROM AN IMAGE

370
OBTAIN A SECOND IMAGE OF THE SCENE, WHEREIN THE SECOND IMAGE HAS THE FIRST RESOLUTION

375
FEED THE BINARY SEGMENTATION MASK AND SECOND IMAGE OF THE SCENE AS INPUTS TO A FIRST MACHINE LEARNING (ML) MODEL

380
TRAIN THE FIRST ML MODEL TO GENERATE AN ALPHA MATTE FOR THE SECOND IMAGE, WHEREIN VALUES IN THE ALPHA MATTE ARE INDICATIVE OF THE FIRST ML MODEL'S CONFIDENCE LEVEL IN WHETHER A CORRESPONDING PORTION OF THE SECOND IMAGE COMPRISES THE FIRST TYPE OF OBJECT

385
WHEREIN THE TRAINING COMPRISES UTILIZING A COST FUNCTION BASED ON AN UPSCALED VERSION OF THE GENERATED ALPHA MATTE

*FIG. 3C*

LOW-LATENCY VIDEO MATTING

BACKGROUND

This disclosure relates generally to image processing. More particularly, but not by way of limitation, this disclosure relates to techniques and systems for generating low-latency, domain-specific, and/or guidance map-free video mattes for captured images.

The advent of mobile, multifunction electronic devices, such as smartphones, wearables, and tablet devices, has resulted in a desire for small form factor cameras capable of generating high levels of image quality in real time or near-real time for integration into such devices. Some such devices offer features that rely on rapid and accurate image processing operations, including so-called "semantic segmentation" operations. Semantic segmentation is becoming increasingly popular in products involving image processing and computer vision. Semantic segmentation may be defined as a process of creating a mask, e.g., a per-pixel mask, over an image, wherein pixels are assigned (or "segmented") into a predefined set of semantic classes. Such segmentations may be binary (e.g., a given pixel may be classified as either a 'foreground pixel' or a 'non-foreground pixel', or a 'hand pixel' or 'non-hand pixel'), or segmentations may also be multi-class (e.g., a given pixel may be labelled as: 'person,' 'dog,' 'cat,' 'hand,' or 'other'). In some implementations, segmentations may produce continuous confidence values for image pixels, e.g., rational numbers in the range 0.0 to 1.0, wherein higher confidence values represent a higher level of confidence that a given pixel reflects a presence of particular semantic class of object in the scene.

In recent years, the most accurate semantic segmentations have been achieved using machine learning (ML) models, such as convolutional neural networks (CNNs). As semantic segmentation techniques grow in accuracy and adoption, it is becoming increasingly important to develop robust methods of utilizing such segmentations and developing flexible techniques for integrating segmentation information into existing computer vision applications, such as depth and/or disparity estimation, hand tracking, alpha matte creation, etc., to yield improved results in a wide range of image capture scenarios.

Some electronic devices are capable of generating and presenting so-called "extended reality" (XR) environments on display screens, such as head mounted devices (HMD), or the like. An XR environment may include a wholly- or partially-simulated environment, including one or more virtual objects, which users of such electronic device can sense and/or interact with. In XR, a subset of a person's physical motions, or representations thereof, may be tracked, and, in response, one or more characteristics of the one or more virtual objects simulated in the XR environment may be adjusted in a manner that comports with at least one law of physics.

When graphical content is displayed in XR environments, novel and highly-efficient video matting techniques, such as those described herein, may be employed that utilize trained ML models, low-resolution input images, and/or various auxiliary signals (e.g., binary segmentation masks) to generate highly-accurate alpha mattes at desired image frame rates.

BRIEF DESCRIPTION OF THE DRAWINGS

FIG. 3A shows a flowchart of a technique for generating alpha mattes for captured images of a scene using a trained ML model and one or more auxiliary inputs, according to one or more embodiments.

FIG. 3B shows a flowchart of a technique for generating alpha mattes for captured images of a scene using a domain-specific trained ML model, according to one or more embodiments.

FIG. 3C shows a flowchart of a technique for training an ML model to generate alpha mattes for captured images of a scene, according to one or more embodiments.

DETAILED DESCRIPTION

Figure 1A:
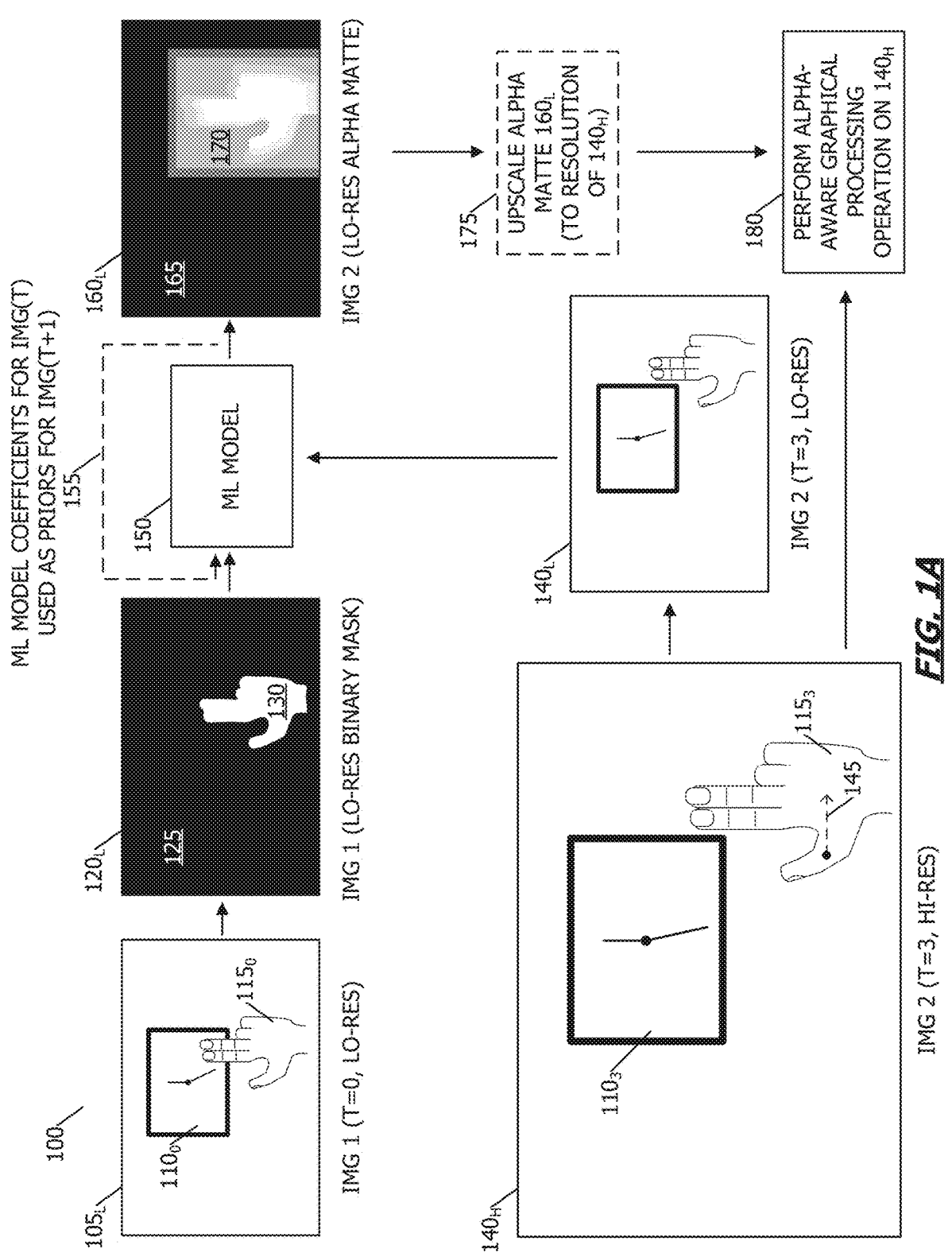
FIG. 1A shows a system for generating alpha mattes for captured images of a scene using a trained ML model and one or more auxiliary inputs, according to one or more embodiments.

This disclosure pertains to systems, methods, and computer readable media for implementing novel techniques to perform low latency, domain-specific, and/or guidance map-free video matting, e.g., for use in extended reality (XR) platforms. The techniques may be designed to work with low resolution auxiliary inputs (e.g., binary segmentation masks) and to generate alpha mattes (e.g., alpha mattes configured to segment out any object(s) of interest, such as human hands, from a captured image) in near real-time—and in a computationally efficient, power efficient, and thermal efficient manner.

Further, in a domain-specific setting, the system can function on a captured image stream alone, i.e., it would not require any auxiliary inputs, thereby further reducing computational costs—without compromising on visual quality and user comfort. Once an alpha matte has been generated, various alpha-aware graphical processing operations may be performed on the captured images according to the generated alpha mattes (e.g., background replacement operations, synthetic shallow depth of field (SDOF) rendering operations, and/or various XR environment rendering operations). In some embodiments, the system can further improve itself in a privacy-preserving manner through self-supervision and/or federated learning techniques.

As mentioned above, the techniques described herein may provide specific enhancements for rendering and presenting graphical information in XR environments. Some XR environments may be filled (or almost filled) with virtual objects or other simulated content (e.g., in the case of pure virtual reality (VR) environments). However, in other XR environments (e.g., in the case of augmented reality (AR) environments, and especially those wherein the user has a wide field of view (FOV), such as a horizontal FOV of 70 degrees or greater), there may be large portions of the user's FOV that have no virtual objects or other simulated content in them at certain times. In other cases, the virtual objects (and/or other simulated content) in an XR environment may be occluded by certain foreground objects in the XR environment. In still other XR environments, it may simply be desirable to perform different graphical processing operations on different parts of the scene (e.g., applying a blurring operation to everything in the scene other than foreground objects, applying a particular texture or color treatment to only any human hands identified in the scene, ensuring that virtual UI elements in an XR environment do not cover over or occlude a user's hands, and so forth).

Thus, what is needed are improved techniques for rendering graphical content in an XR environment that provide improved performance and efficiency for image segmentation and video matting operations. For example, such improvements may be realized by training and using machine learning (ML) models that operate on low resolution inputs and/or one or more auxiliary signals to generate high resolution alpha mattes for captured images in a near-real time or streaming setting.

In one or more embodiments, a device for generating low-latency, domain-specific, and/or guidance map-free video mattes may comprise: a memory; one or more image capture devices; a display screen; and one or more processors operatively coupled to the memory, wherein the one or more processors are configured to execute instructions causing the one or more processors to: obtain a binary segmentation mask for a first captured image of a scene, wherein the binary segmentation mask has a first resolution and is configured to segment out at least a first type of object from an image; obtain a second captured image of the scene, wherein the second captured image has a second resolution that is greater than the first resolution; and feed the binary segmentation mask and a version of the second captured image that is downscaled to the first resolution as inputs to a first trained ML model, wherein an output of the first trained ML model comprises an alpha matte generated for the second captured image of the scene, wherein the generated alpha matte has the first resolution, and wherein values in the generated alpha matte are indicative of the first trained ML model's confidence level in whether a corresponding portion of the second captured image comprises the first type of object. Finally, the device may then perform a first alpha-aware graphical processing operation on the second captured image according to the generated alpha matte. (In some implementations, the alpha matte may preferably be upscaled from the first resolution to the second resolution prior to performing the first alpha-aware graphical processing operation on the second captured image.)

For example, in some embodiments, the first type of object comprises a foreground object, and wherein the first trained ML model is trained to recognize foreground objects in an image. In other embodiments, the first type of object comprises a particular domain of objects (e.g., human hands, human faces, cars, etc.), and wherein the first trained ML model is trained to recognize the particular domain of objects in an image.

In other embodiments, the first captured image is captured by a first one of the one or more image capture devices and the second captured image is captured by a second one of the one or more image capture devices. In still other embodiments, the first captured image of the scene is obtained from a first image capture stream having a first frame rate (e.g., 30 Hz), the second captured image of the scene is obtained from a second image capture stream having a second frame rate (e.g., 90 Hz), and the second frame rate is greater than the first frame rate.

In still other embodiments, the alpha matte comprises a plurality of pixels having continuous confidence values, wherein higher confidence values represent a higher level of confidence that a given pixel reflects a presence of the first type of object in the scene.

In another embodiment, a non-transitory program storage device is disclosed, comprising instructions stored thereon to cause one or more processors to generate low latency, domain-specific, and/or guidance map-free video mattes by causing the one or more processors to: obtain a first captured image of a scene, wherein the first captured image has a first resolution; feed a version of the first captured image that is downscaled to a second resolution as input to a first domain-specific trained ML model, wherein an output of the first domain-specific trained ML model comprises an alpha matte generated for the first captured image of the scene, wherein the generated alpha matte has the second resolution, and wherein values in the generated alpha matte are indicative of the first domain-specific trained ML model's confidence level in whether a corresponding portion of the first captured image comprises an object from the specific domain that the first domain-specific trained ML model is trained to recognize. Then, the one or more processors may perform a first alpha-aware graphical processing operation on the second captured image according to the generated alpha matte (e.g., a background replacement operation; a synthetic shallow depth of field (SDOF) rendering operation; an extended reality (XR) copresence rendering operation; or a user interface (UI) element rendering operation in an XR environment, or the like). As described above, in some implementations, the alpha matte may preferably be upscaled from the first resolution to the second resolution prior to performing the first alpha-aware graphical processing operation on the second captured image.

In still another embodiment, a method for training an ML model to generate alpha mattes for captured images of a scene is disclosed, comprising: obtaining a binary segmentation mask for a first image of a scene, wherein the binary segmentation mask has a first resolution and is configured to segment out at least a first type of object from an image; obtaining a second image of the scene, wherein the second image has the first resolution; feeding the binary segmentation mask and second image of the scene as inputs to a first ML model; and training the first ML model to generate an alpha matte for the second image, wherein values in the alpha matte are indicative of the first ML model's confidence level in whether a corresponding portion of the second image comprises the first type of object.

In some implementations, the training may preferably comprise utilizing a cost function based on an upscaled version of the generated alpha matte. For example, in some embodiments, the upscaled version of the generated alpha matte has a second resolution that is greater than the first resolution.

In some such embodiments, the first type of object may comprise a particular domain of objects (e.g., human hands, human faces, foreground objects, cars, etc.), and the first ML model may be trained to recognize the particular domain of objects in an image. In some implementations, the training data set may preferably comprise training image pairs, wherein the first image and the second image represent captures of the scene at different times, thus making the ML model more robust to temporal differences between binary segmentation masks and captured images at inference time.

Exemplary Extended Reality (XR) Devices

A person can interact with and/or sense a physical environment or physical world without the aid of an electronic device. A physical environment can include physical features, such as a physical object or surface. An example of a physical environment is a physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly- or partially-simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, wearable device, or the like) and adjust graphical content (e.g., foreground objects, background objects, and/or other objects of interest in a given implementation) and/or auditory content presented to the user—e.g., similarly to how such views and sounds would change in a physical environment. In some situations, the XR system can adjust characteristic(s) of graphical content in response to other inputs, such as a representation of a physical motion (e.g., a vocal command) or occlusion by another foreground object in a scene, as will be explained in greater detail below.

Many different types of electronic systems can enable a user to interact with and/or sense an XR environment. A non-exclusive list of examples includes: heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment.

A head mountable system may also have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies, can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

For purposes of this disclosure, a multiuser communication session can include an XR environment in which two or more devices are participating, while a single user session refers to an XR environment in which only one device is participating.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming—but would nevertheless be a routine undertaking for those of ordinary skill in the design and implementation of graphics rendering systems, having the benefit of this disclosure.

Exemplary Low Latency Video Matting Systems Using Trained Machine Learning (ML) Models As used herein, the terms "alpha matting" or "video matting" refer to a computational image synthesis problem of decomposing video signals into two or more layers. For example, a given image, I, may be represented by the following alpha matting equation: $I=\alpha F+(1-\alpha)B$, where F is the foreground layer, B is the background layer, and a is the alpha matte value (e.g., a continuous value within the range 0.0 to 1.0).

Prior art video matting approaches typically mandate the use of a "prior" or "auxiliary" signal, such as a so-called "trimap" (i.e., an image map specifying the locations of background, foreground, and uncertain pixels in an image frame, and which may later be decomposed into foreground and background by the matting method) or other form of "guidance map," along with the input video image frames to simplify the problem and to enhance spatiotemporal fidelity. However, this increases the computational cost—as well as the complexity—of the video matting system. Further, attempting to perform alpha matte generation operations at very high refresh rates (e.g., 90 Hz or greater), as may be required on XR platforms, limits the computational budget available for performing high-resolution and/or highly-accurate alpha matting operations—especially on power-constrained electronic devices. Thus, this is a fundamental problem that needs an efficient and elegant solution for a providing a high-quality user experience on XR platforms.

Referring now to FIG. 1A, a system 100 for generating alpha mattes for captured images of a scene using a trained ML model and one or more auxiliary inputs is shown, according to one or more embodiments. As illustrated in FIG. 1A, an exemplary low-resolution input image frame "IMG 1" $105_L$ is captured at a first time (t=0). Exemplary IMG 1 $105_L$ comprises various types of scene content, e.g., a wall clock ($110_0$), as well as a representation of a human hand ($115_0$) that partially overlaps the wall clock $110_0$. A low-resolution binary mask $120_L$ corresponding to IMG 1 $105_L$ is also obtained by the system 100. In this example, the binary mask has been trained and/or configured to attempt to segment human hands out from a captured scene, though it is to be understood that the binary mask $120_L$ could be directed to any object(s) of interest. In the coding scheme used by FIG. 1A, white pixels (e.g., 130) in binary mask $120_L$ represent values of '1,' i.e., pixels that are a part of the mask (in this case, pixels estimated to represent human hands), and black pixels (e.g., 125) represent values of '0,' i.e., pixels that are not a part of the mask (in this case, pixels estimated to not represent human hands).

Also illustrated in FIG. 1A is an exemplary high-resolution input image frame "IMG 2" $140_H$ that is captured at an exemplary second time (in this case, t=3, which may represent a moment in time three captured video image frames later than the capture of IMG 1 $105_L$ at time t=0). The temporal misalignment between low-resolution binary mask $120_L$ and the high-resolution input image frame IMG 2 $140_H$ in this example is shown by dashed line arrow 145, indicating that the representation of the human hand ($115_3$) in IMG 2 $140_H$ has moved to the right and no longer partially overlaps the virtual presentation $110_3$, as captured in IMG 2 $140_H$.

It is to be understood that the use of a capture time of t=3 for IMG 2 $140_H$ in this example is used purely to illustrate the fact that the that the low-resolution binary mask $120_L$ and the high-resolution input image frame IMG 2 $140_H$ for which an alpha matte is being generated need not be temporally coherent. As long as the image upon which the low-resolution binary mask is based and the high-resolution input image frame are captured within a predetermined threshold amount of time from one another (e.g., up to +/−n milliseconds of difference in respective capture times, as may be defined for a given implementation and training scheme) and share a sufficient amount of overlapping scene content, the ML model 150 will still be able to estimate and generate an accurate low-resolution alpha matte (e.g., $160_L$) in a computationally efficient and near-real time fashion, which may serve as an intermediate prediction of the final alpha matte generated for the scene. It is also noted that the images $105_L$ and $140_H$ could be captured by different image capture devices (e.g., different embedded cameras of the same electronic device) and/or be obtained from image capture streams having different frame rates. For example, an electronic device could capture 3 or 4 high resolution images (such as image $140_H$) for every one instance of a low-resolution binary mask (such as $120_L$) that is generated by the electronic device. Hence, as may now be understood, having an ML model trained to be robust to temporal misalignment in its input data allows the system to be able to generate high-quality alpha mattes at a rate much faster than the system is actually producing the auxiliary guidance signal (i.e., in this example, the low-resolution binary mask, $120_L$).

According to some embodiments, further efficiencies may be gained by first downscaling the high-resolution input image frame IMG 2 $140_H$ to a lower resolution version (as shown at $140_L$ in FIG. 1A), e.g., downscaling IMG 2 $140_H$ to match the resolution of the aforementioned low-resolution binary mask $120_L$, before feeding image $140_L$ as an input into ML model 150. As alluded to above, ML model 150 may be configured to take a low-resolution binary mask and low-resolution image frame as inputs and generate an accurate low-resolution alpha matte for the input image frame (e.g., as shown at $160_L$) in a computationally efficient and near-real time fashion—even if the low-resolution binary mask and low-resolution image frame are not temporally aligned. As will be described in further detail below, ML model 150 may have been trained to produce a low-resolution alpha matte that maximizes accuracy (e.g., by minimizing an error function used during training) when the low-resolution alpha matte is upscaled, for example, by applying the error function during training to an upscaled version of the low-resolution alpha matte, i.e., rather than the low-resolution alpha matte output.

In the coding scheme used by FIG. 1A, non-black pixels (e.g., 170) in alpha matte $160_L$ represent values greater than 0.0 and up to and including 1.0 (i.e., represented as pure white pixels in alpha matte $160_L$), wherein the brighter the pixels are in the estimated alpha matte $160_L$, the more confidence the ML model 150 had that such pixels represent human hands in the input image $140_L$. Pure black pixels (e.g., 165) again represent values of '0,' i.e., regions of the image where the ML model 150 had full confidence that such pixels did not represent human hands.

If so desired, at block 175, an upscaling operation may be applied to alpha matte $160_L$, e.g., to scale it up to the same resolution as the original high-resolution input image frame IMG 2 $140_H$. Finally, at block 180, the system 100 may perform one or more alpha-aware graphical processing operations on the original high-resolution input image frame IMG 2 $140_H$, according to the (optionally upscaled) generated alpha matte $160_L$. As mentioned above, many graphical processing operations may benefit from the use of highly accurate and computationally-efficient alpha mattes (especially those produced in near-real time, e.g., at 90 Hz or greater image frame rates), such as: background replacement operations, synthetic shallow depth of field (SDOF) rendering operations, and/or various other XR environment rendering operations (e.g., rendering of UI elements, human hand overlays, etc.).

As may now be appreciated, the exemplary repurposing of hand detection output for video matting, as described above with reference to FIG. 1A, provides a novel system that repurposes output of a hand detection algorithm (or other type of 3D object detection algorithm) that may, e.g., be focused on determining a user's intent or desired input to a computing system, such as by detecting certain hand gestures or poses based on an analysis of data captured by various types and resolutions of cameras. In some instances, such hand detection algorithms may even generate 3D models (or at least wireframe skeleton representations) of the hands detected in a given scene. From such 3D representations of the hands, a binary mask, such as the aforementioned binary segmentation mask $120_L$ may be generated to match the current viewpoint of the scene camera (e.g., as shown in exemplary high-resolution input image frame IMG 2 $140_H$). The process of generating binary segmentation mask $120_L$ may thus involve rasterizing the 3D representations of the hands based on scene depth information, camera viewpoint, or other factors, such that binary segmentation mask $120_L$ may provide an instructive input to ML model 150 for the prediction of a low-resolution alpha matte $160_L$ for the current viewpoint of the scene camera.

According to some embodiments, e.g., as illustrated by dashed line arrow 155, the output produced by ML model 150 for a given input image frame $140_t$ (i.e., representing the scene at a capture time, t) may be used as a set of "priors," i.e., initial beliefs or predictions for the model's output, for the alpha matte that should be produced by the ML model 150 for a subsequently-captured input image frame $140_{t+1}$ (i.e., representing the scene at a later capture time, t+1). The more that such prior constraints are enforced by the ML model 150, the more temporal consistency there may be from frame-to-frame, i.e., in terms of the alpha matte output that is generated by ML model 150. By improving the temporal consistency of the ML model 150's output, it may reduce the amount or likelihood of flickering (and/or skipping of frames) in the model's predictions of the locations of objects of interest (e.g., hands) from frame to frame in the image capture stream.

Figure 1B:
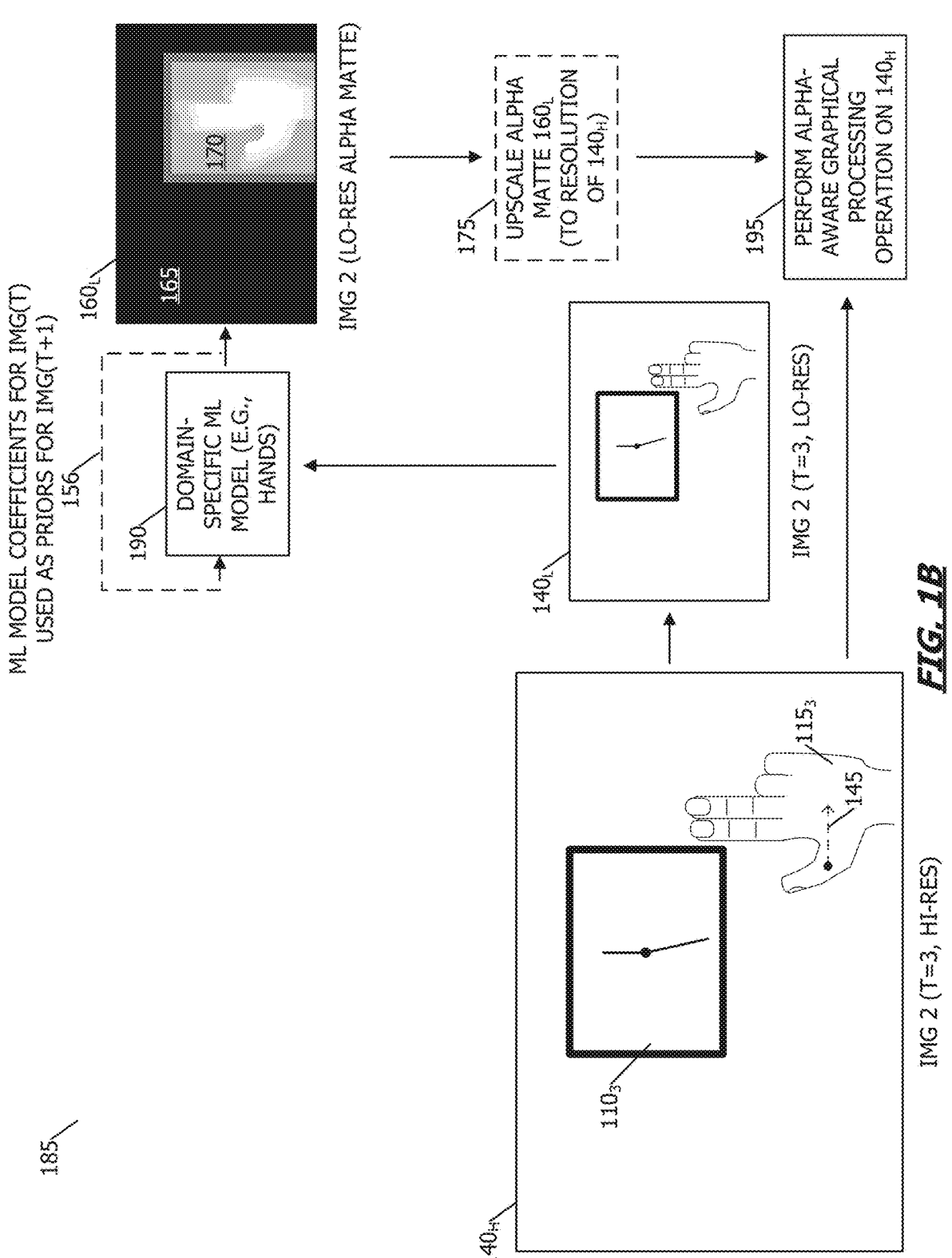
FIG. 1B shows a system for generating alpha mattes for captured images of a scene using a domain-specific trained ML model, according to one or more embodiments.

Referring now to FIG. 1B, a system 185 for generating alpha mattes for captured images of a scene using a domain-specific trained ML model is shown, according to one or more embodiments. System 185 of FIG. 1B is similar to that of system 100 of FIG. 1A, described above, with the exception that there is no additional auxiliary input signal or other form of guidance provided to the ML model 190 of system 185 (i.e., such as the low-resolution binary mask $120_L$ auxiliary signal that was fed as an input into ML model 150 of system 100). Instead, the ML model 190 is said to be a "domain-specific ML model," i.e., it has been trained to recognize and segment out, e.g., in the form of an alpha matte, only objects in the scene from the specific domain that the ML model 190 has been trained for (e.g., human hands, cars, human faces, cats, etc.). Thus, the only input to ML model 190, as shown in system 185, is the aforementioned lower-resolution input image frame IMG 2 $140_L$.

As described above with reference to FIG. 1A, according to some embodiments, e.g., as illustrated by dashed line arrow 156, the output produced by ML model 190 for a given input image frame $140_t$ (i.e., representing the scene at a capture time, t) may be used as a set of "priors," i.e., initial beliefs or predictions for the model's output, for the alpha matte that should be produced by the ML model 190 for a subsequently-captured input image frame $140_{t+1}$ (i.e., representing the scene at a later capture time, t+1).

Figure 2:
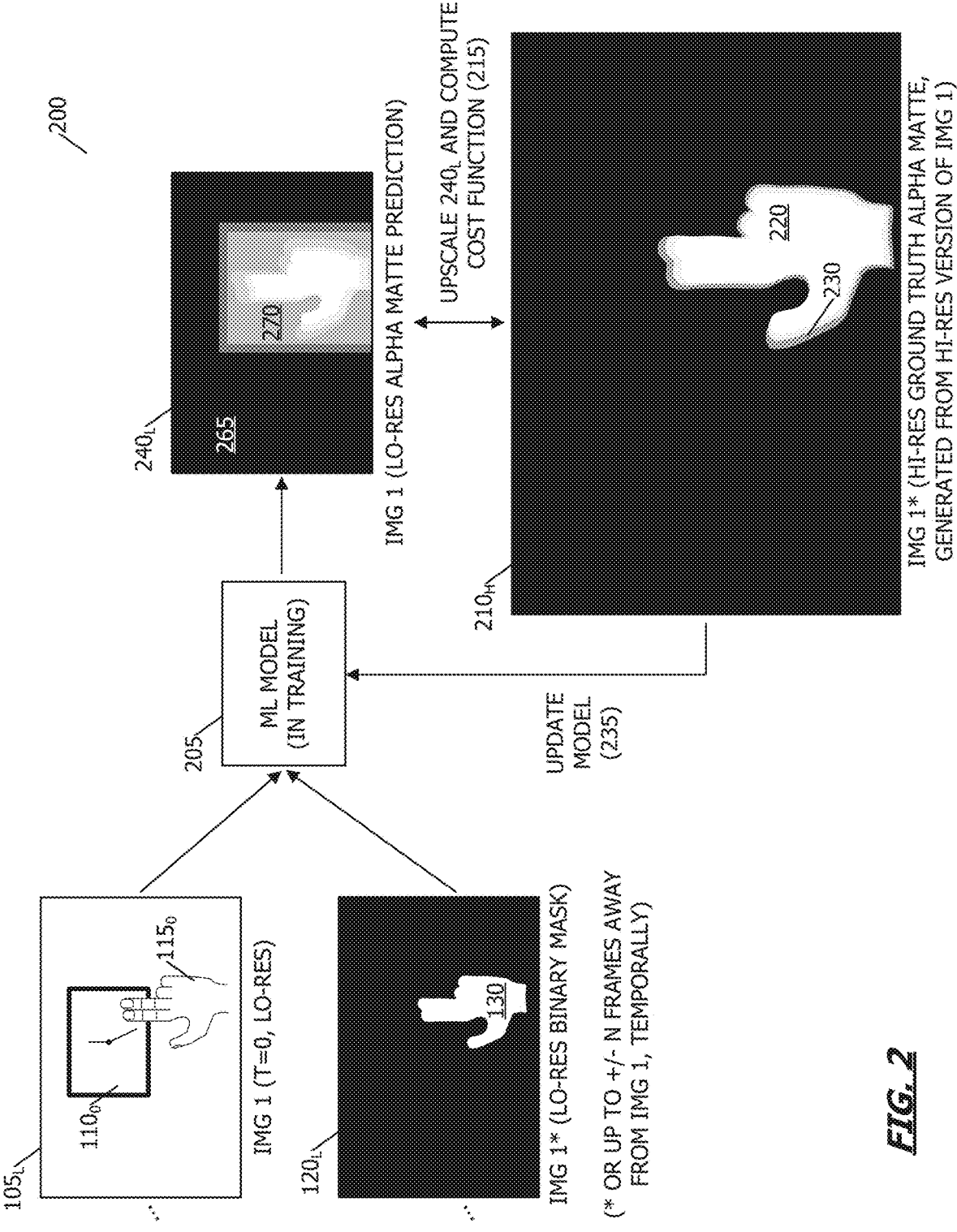
FIG. 2 shows an example system for training an ML model to generate alpha mattes for captured images of a scene, according to one or more embodiments.

As described above with reference to system 100 of FIG. 1A, the ML model 190 may be configured to take a low-resolution image frame as input and generate an accurate low-resolution alpha matte (e.g., as shown at $160_L$) for the input image frame in a computationally efficient and near-real time fashion (and without any low-resolution binary mask or other auxiliary input signal). Again, as described above with reference to system 100 of FIG. 1A, non-black pixels (e.g., 165) in alpha matte $160_L$ represent values greater than 0.0 and up to and including 1.0, wherein the brighter the pixels are in the estimated alpha matte $160_L$, the more confidence the ML model 190 had that such pixels represent human hands in the input image $140_L$. Pure black pixels (e.g., 165) again represent values of '0,' i.e., regions of the image where the ML model 190 had full confidence that such pixels did not represent human hands. If so desired, at block 175, an upscaling operation may be applied to alpha matte $160_L$, e.g., to scale it up to the same resolution as the original high-resolution input image frame IMG 2 $140_H$. Finally, at block 195, the system 185 may perform one or more alpha-aware graphical processing operations on the original high-resolution input image frame IMG 2 $140_H$, according to the (optionally upscaled) generated alpha matte $160_L$. Thus, while system 185 may be even more efficient than system 100 from a computational, power, and/or thermal standpoint (e.g., due to not requiring any additional auxiliary input signals), the domain-specific nature of ML model 190 may be too inflexible for some implementations, e.g., those that need to be able to segment and/or matte out a wide variety of object domains from input image frames. It is also noted that, in other implementations, while it may reduce somewhat the system's overall computational, power, and/or thermal efficiency, it may not be necessary to downscale the input image frame to a lower resolution before processing it with the domain-specific ML model 190. In other words, ML model 190 may be trained to operate on full resolution input images and generate full resolution alpha mattes (thereby also obviating the need to upscale the alpha matte at block 175, as described above). Exemplary Systems for Training an ML Model to Generate Alpha Mattes for Captured Images of a Scene Referring now to FIG. 2, an example 200 of a system for training an ML model to generate alpha mattes for captured images of a scene, according to one or more embodiments. Example 200 utilizes the same exemplary image $105_L$ (IMG 1) and low-resolution binary mask $120_L$ described above with reference to FIG. 1A and FIG. 1B. However, in the example 200 of FIG. 2, the exemplary image $105_L$ and low-resolution binary mask $120_L$ are being used to train ML model 205 to generate low-resolution alpha matte prediction, such as exemplary low-resolution alpha matte $240_L$. Non-black pixels (e.g., 270) in alpha matte $240_L$ again represent values greater than 0.0 and up to and including 1.0, wherein the brighter the pixels are in the predicted alpha matte $240_L$, the more confidence the ML model 205 had that such pixels represent human hands in the input image $105_L$. Pure black pixels (e.g., 265) again represent values of '0,' i.e., regions of the image where the ML model 205 had full confidence that such pixels did not represent human hands.

It is to be understood that many training image sets of exemplary captured images (e.g., $105_L$) and, if used in a given implementation, binary segmentation masks (e.g., $120_L$) and their corresponding "ground truth" high resolution alpha mattes (e.g., $210_H$, as may be generated from a high-resolution version of exemplary IMG 1 $105_L$) for the object(s) of interest in the respective exemplary captured images may be used in the training of the ML model 205. Similar to the coding schemes described above, non-black pixels (e.g., white pixels 220 and gray pixels 230) in alpha matte $210_H$ represent values greater than 0.0 and up to and including 1.0, wherein the brighter the pixels are in the ground truth alpha matte $210_H$, the more confidence there is that such pixels represent human hands in the input image 105. Pure black pixels (e.g., 225) again represent values of '0,' i.e., regions of the image where there is full confidence that such pixels did not represent human hands.

According to some embodiments, at step 215, the training process may preferably further utilize a cost function based on an upscaled version of the low-resolution alpha matte $240_L$. In other words, the upscaled version of the low-resolution alpha matte $240_L$ may be compared to the ground truth alpha matte $210_H$, and the differences may be used, at Step 235, to update one or more coefficients or other parameters of the ML model 205, until the training process is deemed to be complete (e.g., when the ML model 205 is generating sufficiently accurate alpha mattes for incoming image frames). As may now be appreciated, by training the ML model 205 with a cost function that accounts for the upsampling of the ML model's output to the full resolution of the captured image frames that the system is likely to obtain at inference time, additional accuracy may be recovered in the generated alpha mattes, while still maintaining efficient operations.

Exemplary Low Latency, Domain Specific, Guidance Map-Free Video Matting Operations for XR Platforms Referring now to FIG. 3A, a flowchart 300 of a technique for generating alpha mattes for captured images of a scene using a trained ML model and one or more auxiliary inputs is shown, according to one or more embodiments. First, at step 305, the method 300 may obtain a binary segmentation mask for a first captured image of a scene, wherein the binary segmentation mask has a first resolution and is configured to segment out at least a first type of object from an image. Next, at step 310, the method 300 may obtain a second captured image of the scene, wherein the second captured image has a second resolution that is greater than the first resolution.

Next, at step 315, the method 300 may feed the binary segmentation mask and a version of the second captured image that is downscaled to the first resolution as inputs to a first trained machine learning ML, wherein an output of the first trained ML model comprises an alpha matte generated for the second captured image of the scene, wherein the generated alpha matte has the first resolution, and wherein values in the generated alpha matte are indicative of the first trained ML model's confidence level in whether a corresponding portion of the second captured image comprises the first type of object, i.e., the ML-model generated alpha matte may serve as an intermediate prediction of the alpha matte for the image, subject to any upscaling, modification, or further refinement in order for the alpha matte to be used with a high-resolution or full-resolution version of the image.

Finally, at step 320, the method 300 may perform a first alpha-aware graphical processing operation on the second captured image according to the generated alpha matte. As mentioned above, preferably, at step 325, the method 300 may upscale the alpha matte from the first resolution to the second resolution prior to performing the first alpha-aware graphical processing operation on the second captured image.

Referring now to FIG. 3B, a flowchart 330 of a technique for generating alpha mattes for captured images of a scene using a domain-specific trained ML model is shown, according to one or more embodiments. First, at step 335, the method 330 may obtain a first captured image of a scene, wherein the first captured image has a first resolution.

Next, at step 340, the method 330 may feed a version of the first captured image that is downscaled to a second resolution as input to a first domain-specific trained ML model, wherein an output of the first domain-specific trained ML model comprises an alpha matte generated for the first captured image of the scene, wherein the generated alpha matte has the second resolution, and wherein values in the generated alpha matte are indicative of the first domain-specific trained ML model's confidence level in whether a corresponding portion of the first captured image comprises an object from the specific domain that the first domain-specific trained ML model is trained to recognize.

Finally, at step 345, the method 330 may perform a first alpha-aware graphical processing operation on the second captured image according to the generated alpha matte. Preferably, at step 350, the method 330 may upscale the alpha matte from the first resolution to the second resolution prior to performing the first alpha-aware graphical processing operation on the second captured image.

Referring now to FIG. 3C, a flowchart 360 of a technique for training an ML model to generate alpha mattes for captured images of a scene is shown, according to one or more embodiments. First, at step 365, the method 330 may obtain a binary segmentation mask for a first image of a scene, wherein the binary segmentation mask has a first resolution and is configured to segment out at least a first type of object from an image.

Next, at step 370, the method 360 may obtain a second image of the scene, wherein the second image has the first resolution and then, at step 375, the method 360 may feed the binary segmentation mask and second image of the scene as inputs to a first machine learning (ML) model.

At step 380, the method 360 may iteratively train (i.e., over a training data set comprising hundreds or thousands of pairs of exemplary captured images and corresponding "ground truth" alpha mattes for the object(s) of interest in the respective exemplary captured images) the first ML model to generate an alpha matte for the second image, wherein values in the alpha matte are indicative of the first ML model's confidence level in whether a corresponding portion of the second image comprises the first type of object. As mentioned above with reference to FIG. 2, according to some embodiments, at Step 385, the training may preferably further comprise utilizing a cost function based on an upscaled version of the generated alpha matte.

Exemplary Block Diagram

Figure 4:
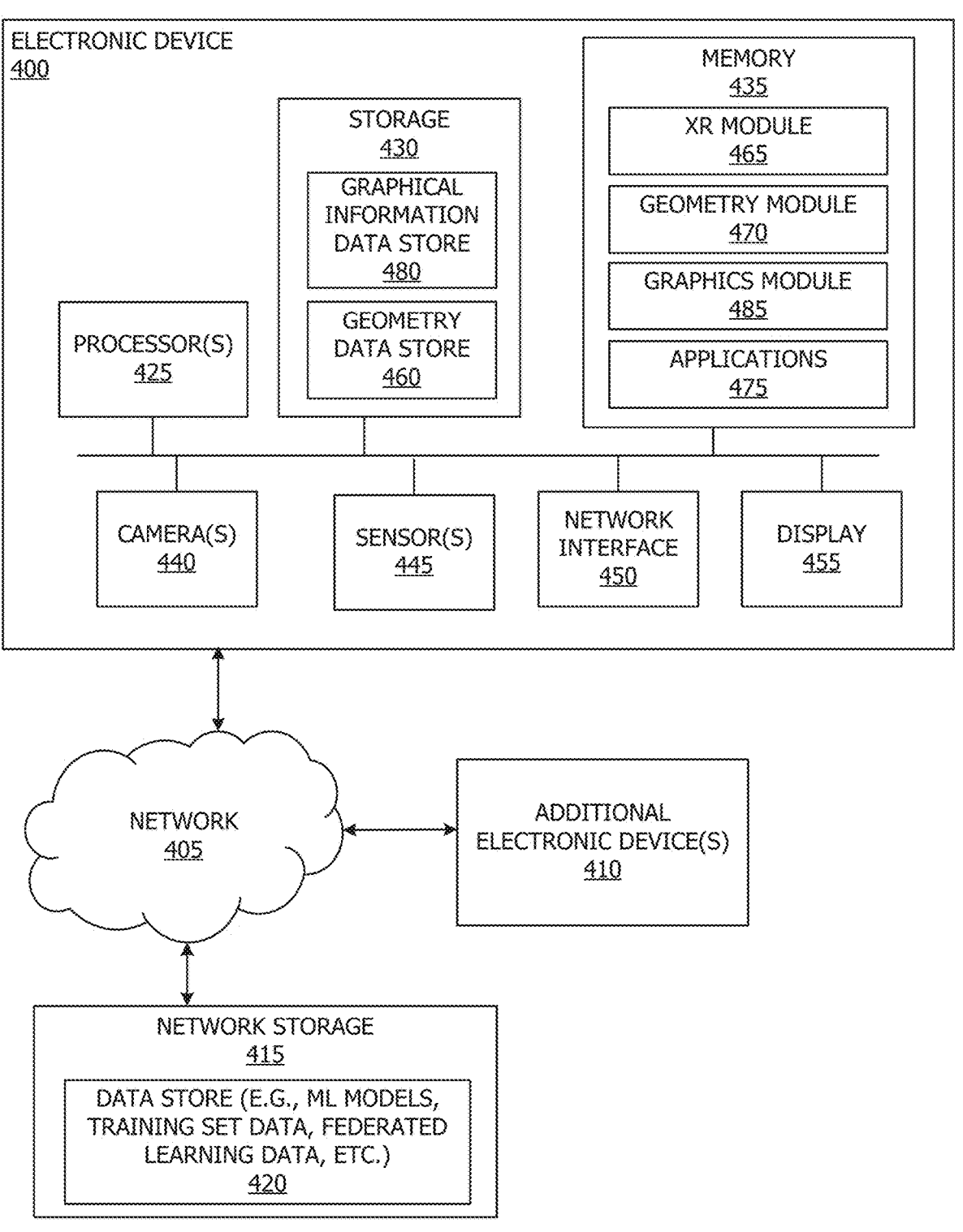
FIG. 4 shows, in block diagram form, a simplified system diagram according to one or more embodiments.

Referring now to FIG. 4, a simplified block diagram of an electronic device 400 is depicted, communicably connected to additional electronic devices 410 and a network storage 415 over a network 405, in accordance with one or more embodiments of the disclosure. Electronic device 400 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 400, additional electronic device 410, and/or network storage 415 may additionally, or alternatively, include one or more additional devices within which the various functionality may be contained, or across which the various functionality may be distributed, such as server devices, base stations, accessory devices, and the like. Illustrative networks, such as network 405 include, but are not limited to, a local network such as a universal serial bus (USB) network, an organization's local area network, and a wide area network such as the Internet. According to one or more embodiments, electronic device 400 may be utilized to participate in a single user or multiuser communication session in an XR environment. It should be understood that the various components and functionality within electronic device 400, additional electronic device 410 and network storage 415 may be differently distributed across the devices, or they may be distributed across additional devices.

Electronic Device 400 may include one or more processors 425, such as a central processing unit (CPU). Processor(s) 425 may include a system-on-chip such as those found in mobile devices and include one or more dedicated graphics processing units (GPUs). Further, processor(s) 425 may include multiple processors of the same or different type. Electronic device 400 may also include a memory 435. Memory 435 may include one or more different types of memory, which may be used for performing device functions in conjunction with processor(s) 425. For example, memory 435 may include cache, ROM, RAM, or any kind of transitory or non-transitory computer readable storage medium capable of storing computer readable code. Memory 435 may store various programming modules for execution by processor(s) 425, including XR module 465, geometry module 470, graphics module 485, and other various applications 475. Electronic device 400 may also include storage 430. Storage 430 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Electronic device may additionally include a network interface 450, from which the electronic device 400 can communicate across network 405.

Electronic device 400 may also include one or more cameras 440 or other sensors 445, such as depth sensor(s), from which depth or other characteristics of an environment may be determined. In one or more embodiments, each of the one or more cameras 440 may be a traditional RGB camera, or a depth camera. Further, cameras 440 may include a stereo- or other multi-camera system, a time-of-flight camera system, or the like. Electronic device 400 may also include a display 455. The display device 455 may utilize digital light projection, OLEDs, LEDs, ULEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 430 may be utilized to store various data and structures which may be utilized for providing state information in order to manage geometry data for physical environments of a local user and/or a remote user. Storage 430 may include, for example, geometry data store 460. Geometry data store 460 may be utilized to store data related to one or more physical environments in which electronic device 400 participates, e.g., in a single user session or a multiuser communication session. For example, geometry data store 460 may store characteristics of a physical environment, which may affect available space for presentation of components (e.g., UI elements or other graphical components to be displayed in an XR environment) during a single user sessions or multiuser communication sessions. As another example, geometry data store 460 may store characteristics of a physical environment, which may affect how a user is able to move around or interact with the physical environment around the device. Storage 430 may further include, for example, graphical information data store 480. Graphical information data store 480 may store characteristics of graphical information (e.g., alpha matte information, depth information and/or color information) that may be composited and rendered in an image frame containing a representation of all or part of the user's physical environment. Additionally, or alternatively, geometry data, graphical information data, ML models, training set data, and/or federated learning data, etc. may be stored across network 405, such as by data store 420. As may be appreciated, in some implementations, federated learning may be utilized to improve the performance of the ML models used in the low-latency video matting operations described herein in a privacy-respectful manner, e.g., by exchanging anonymized ML model updates between various individual users via network 405.

According to one or more embodiments, memory 435 may include one or more modules that comprise computer readable code executable by the processor(s) 425 to perform functions. The memory may include, for example, an XR module 465, which may be used to process information in an XR environment. The XR environment may be a computing environment which supports a single user experience by electronic device 400, as well as a shared, multiuser experience, e.g., involving collaboration with an additional electronic device(s) 410.

The memory 435 may also include a geometry module 470, for processing information regarding the characteristics of a physical environment, which may affect how a user moves around the environment or interacts with physical and/or virtual objects within the environment. The geometry module 470 may determine geometric characteristics of a physical environment, for example from sensor data collected by sensor(s) 445, or from pre-stored information, such as from geometry data store 460. Applications 475 may include, for example, computer applications that may be experienced in an XR environment by one or multiple devices, such as electronic device 400 and additional electronic device(s) 410. The graphics module 485 may be used, e.g., for processing information regarding characteristics of graphical information, including depth and/or color information, which may or may not be composited into an image frame depicting all or part of a user's physical environment)

Although electronic device 400 is depicted as comprising the numerous components described above, in one or more embodiments, the various components may be distributed across multiple devices. Accordingly, although certain processes are described herein, with respect to the particular systems as depicted, in one or more embodiments, the various processes may be performed differently, based on the differently-distributed functionality. Further, additional components may be used, some combination of the functionality of any of the components may be combined.

Exemplary Electronic Devices

Figure 5A:
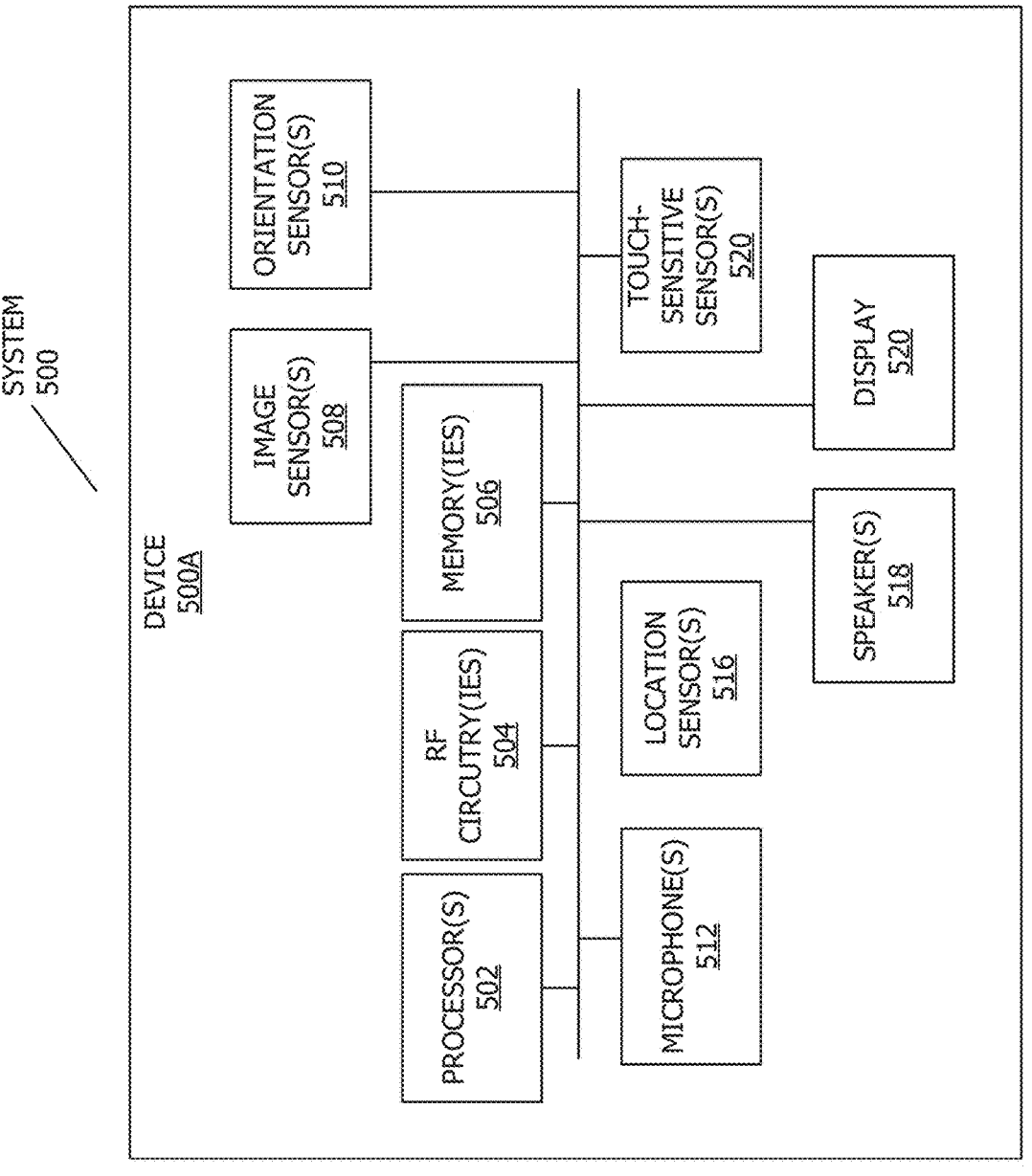
FIGS. 5A-5B show exemplary systems for use in various computer-simulated XR technologies.
Figure 5B:
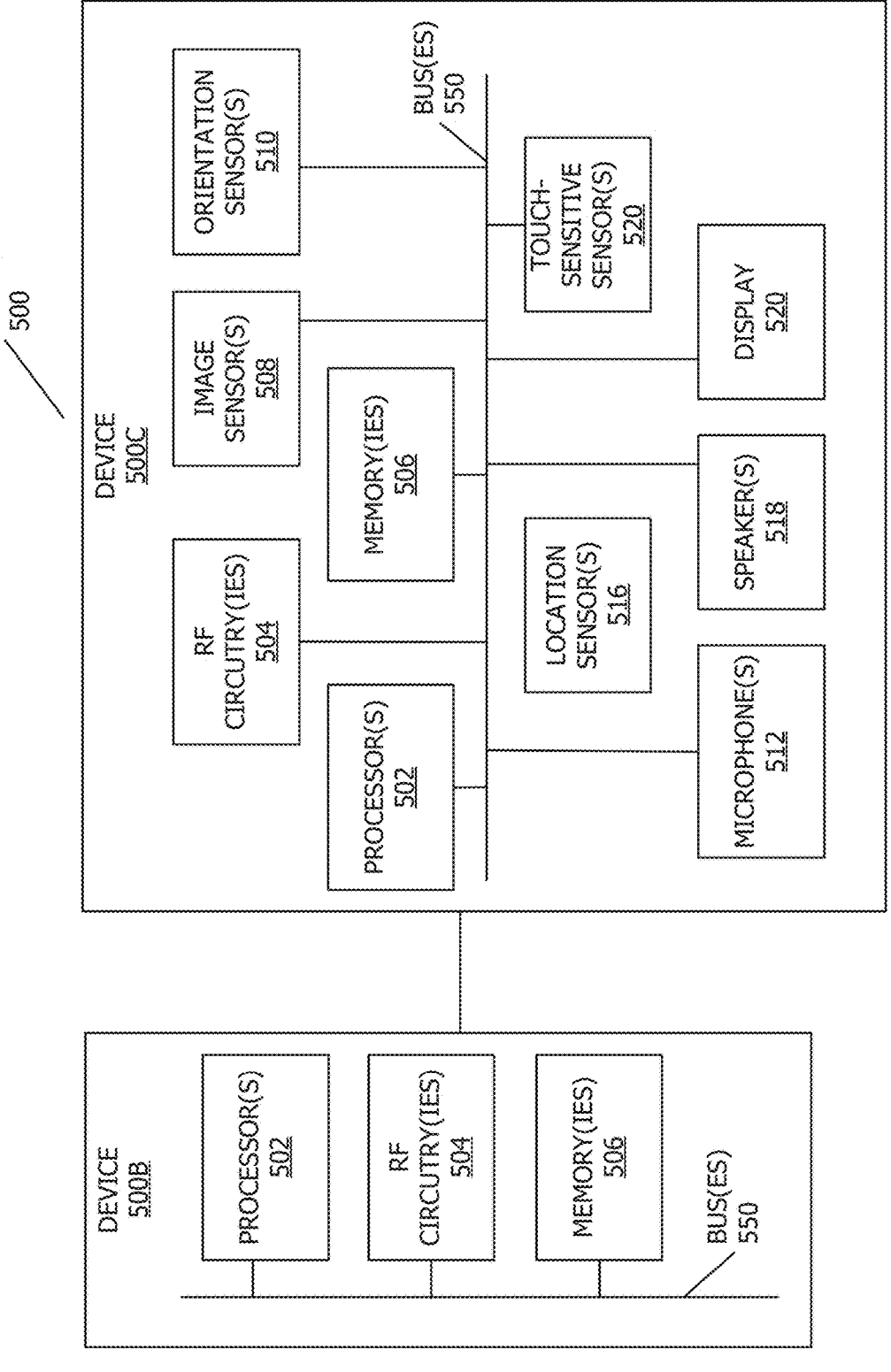

FIG. 5A and FIG. 5B depict exemplary system 500 for use in various extended reality (XR) technologies. In some examples, as illustrated in FIG. 5A, system 500 includes device 500A. Device 500A includes various components, such as processor(s) 502, RF circuitry(ies) 504, memory(ies) 506, image sensor(s) 508, orientation sensor(s) 510, microphone(s) 512, location sensor(s) 516, speaker(s) 518, display(s) 520, and touch-sensitive sensor(s) 522. These components optionally communicate over communication bus(es) 550 of device 500a.

In some examples, elements of system 500 are implemented in a base station device (e.g., a computing device, such as a remote server, mobile device, or laptop) and other elements of system 500 are implemented in a second device (e.g., a head-mounted device, or "HMD"). In some examples, device 500A is implemented in a base station device or a second device.

As illustrated in FIG. 5B, in some examples, system 500 includes two (or more) devices in communication, such as through a wired connection or a wireless connection. First device 500B (e.g., a base station device) includes processor(s) 502, RF circuitry(ies) 504, and memory(ies) 506. These components optionally communicate over communication bus(es) 550 of device 500C. Second device 500C (e.g., a head-mounted device, or "HMD") includes various components, such as processor(s) 502, RF circuitry(ies) 504, memory(ies) 506, image sensor(s) 508, orientation sensor(s) 510, microphone(s) 512, location sensor(s) 516, speaker(s) 518, display(s) 520, and touch-sensitive sensor(s) 522.

These components optionally communicate over communication bus(es) 550 of device 500C.

System 500 includes processor(s) 502 and memory(ies) 506. Processor(s) 502 include one or more general processors, one or more graphics processors, and/or one or more digital signal processors. In some examples, memory(ies) 506 are one or more non-transitory computer-readable storage mediums (e.g., flash memory, random access memory) that store computer-readable instructions configured to be executed by processor(s) 502 to perform the techniques described below.

System 500 includes RF circuitry(ies) 504. RF circuitry (ies) 504 optionally include circuitry for communicating with electronic devices, networks, such as the Internet, intranets, and/or a wireless network, such as cellular networks and wireless local area networks (LANs). RF circuitry (ies) 504 optionally includes circuitry for communicating using near-field communication and/or short-range communication, such as Bluetooth®.

System 500 includes display(s) 520. Display(s) 520 may have an opaque display. Display(s) 520 may have a transparent or semi-transparent display that may incorporate a substrate through which light representative of images is directed to an individual's eyes. Display(s) 520 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 520 include heads up displays, automotive windshields with the ability to display graphics, windows with the ability to display graphics, lenses with the ability to display graphics, tablets, smartphones, and desktop or laptop computers. Alternatively, system 500 may be designed to receive an external display (e.g., a smartphone). In some examples, system 500 is a projection-based system that uses retinal projection to project images onto an individual's retina or projects virtual objects into a physical setting (e.g., onto a physical surface or as a holograph).

In some examples, system 500 includes touch-sensitive sensor(s) 522 for receiving user inputs, such as tap inputs and swipe inputs. In some examples, display(s) 520 and touch-sensitive sensor(s) 522 form touch-sensitive display (s).

System 500 includes image sensor(s) 508. Image sensors (s) 508 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 508 also optionally include one or more event camera(s) configured to capture movement of physical elements in the physical setting. Image sensor(s) 508 also optionally include one or more depth sensor(s) configured to detect the distance of physical elements from system 500. In some examples, system 500 uses CCD sensors, event cameras, and depth sensors in combination to detect the physical setting around system 500. In some examples, image sensor(s) 508 include a first image sensor and a second image sensor. The first image sensor and the second image sensor are optionally configured to capture images of physical elements in the physical setting from two distinct perspectives. In some examples, system 500 uses image sensor(s) 508 to receive user inputs, such as hand gestures. In some examples, system 500 uses image sensor(s) 508 to detect the position and orientation of system 500 and/or display(s) 520 in the physical setting. For example, system 500 uses image sensor (s) 508 to track the position and orientation of display(s) 520 relative to one or more fixed elements in the physical setting.

In some examples, system 500 includes microphones(s) 512. System 500 uses microphone(s) 512 to detect sound from the user and/or the physical setting of the user. In some examples, microphone(s) 512 includes an array of microphones (including a plurality of microphones) that optionally operate in tandem, such as to identify ambient noise or to locate the source of sound in space of the physical setting.

System 500 includes orientation sensor(s) 510 for detecting orientation and/or movement of system 500 and/or display(s) 520. For example, system 500 uses orientation sensor(s) 510 to track changes in the position and/or orientation of system 500 and/or display(s) 520, such as with respect to physical elements in the physical setting. Orientation sensor(s) 510 optionally include one or more gyroscopes and/or one or more accelerometers.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 3A-3C, or the arrangement of elements shown in FIGS. 4 and 5A-5B, should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A device, comprising:

a memory;

one or more image capture devices;

a display screen; and one or more processors operatively coupled to the memory, wherein the one or more processors are configured to execute instructions causing the one or more processors to:

obtain a first captured image of a scene from one of the one or more image capture devices, wherein the first captured image of the scene is obtained from a first image capture stream having a first frame rate;

obtain a binary segmentation mask for the first captured image of a scene, wherein the binary segmentation mask has a first resolution and segments out at least a first type of object from an image;

obtain a second captured image of the scene from one of the one or more image capture devices, wherein the second captured image of the scene is obtained from a second image capture stream having a second frame rate, and wherein the second captured image has a second resolution that is greater than the first resolution;

downscale a version of the second captured image to the first resolution;

feed the binary segmentation mask and the version of the second captured image that is downscaled to the first resolution as inputs to a first trained machine learning (ML) model, wherein at least one output from the first trained ML model for a previously-processed image is used as a prior constraint for generation of an alpha matte for a captured image the first trained ML model is currently processing, wherein an output of the first trained ML model comprises a first alpha matte generated for the second captured image, wherein the first alpha matte has the first resolution, and wherein values in the first alpha matte are indicative of the first trained ML model's confidence level in whether a corresponding portion of the second captured image comprises the first type of object;

upscale the first alpha matte from the first resolution to the second resolution; and perform a first alpha-aware graphical processing operation on the second captured image according to the upscaled first alpha matte.

2. The device of claim 1, wherein the one or more processors are further configured to execute instructions causing the one or more processors to:

obtain a third captured image of the scene, wherein the third captured image has the second resolution and is captured subsequently to the second captured image;

downscale a version of the third captured image to the first resolution;

feed the binary segmentation mask and the version of the third captured image that is downscaled to the first resolution as input to the first trained ML model, wherein at least one output from the first trained ML model for the second captured image is used as a prior constraint to the first trained ML model for generation of a second alpha matte for the third captured image; and perform a second alpha-aware graphical processing operation on the third captured image according to the second alpha matte.

3. The device of claim 1, wherein the first type of object comprises a particular domain of objects, and wherein the first trained ML model is trained to recognize the particular domain of objects in an image.

4. The device of claim 1, wherein the first captured image and the second captured image are captured at different times.

5. The device of claim 1, wherein the first captured image is captured by a first one of the one or more image capture devices and the second captured image is captured by a second one of the one or more image capture devices.

6. The device of claim 1, wherein the second frame rate is greater than the first frame rate.

7. The device of claim 1, wherein the first alpha matte comprises a plurality of pixels having continuous confidence values, and wherein higher confidence values represent a higher level of confidence that a given pixel reflects a presence of the first type of object in the scene.

8. A non-transitory computer readable medium comprising programming instructions stored thereon to cause one or more processors to:

obtain a first captured image of a scene from one image capture device of one or more image capture devices, wherein the first captured image of the scene is obtained from a first image capture stream having a first frame rate;

obtain a binary segmentation mask for the first captured image of a scene, wherein the binary segmentation mask has a first resolution and segments out at least a first type of object from an image;

obtain a second captured image of the scene from one of the one or more image capture devices, wherein the second captured image of the scene is obtained from a second image capture stream having a second frame rate, and wherein the second captured image has a second resolution that is greater than the first resolution;

downscale a version of the second captured image to the first resolution;

feed the binary segmentation mask and the version of the second captured image that is downscaled to the first resolution as inputs to a first trained machine learning (ML) model, wherein at least one output from the first trained ML model for a previously-processed image is used as a prior constraint for generation of an alpha matte for a captured image the first trained ML model is currently processing, wherein an output of the first trained ML model comprises a first alpha matte generated for the second captured image, wherein the first alpha matte has the first resolution, and wherein values in the first alpha matte are indicative of the first trained ML model's confidence level in whether a corresponding portion of the second captured image comprises the first type of object;

upscale the first alpha matte from the first resolution to the second resolution; and perform a first alpha-aware graphical processing operation on the second captured image according to the upscaled first alpha matte.

9. The non-transitory computer readable medium of claim 8, wherein the one or more processors are further configured to execute instructions causing the one or more processors to:

obtain a third captured image of the scene, wherein the third captured image has the second resolution and is captured subsequently to the second captured image;

downscale a version of the third captured image to the first resolution;

feed the binary segmentation mask and the version of the third captured image that is downscaled to the first resolution as input to the first trained ML model, wherein at least one output from the first trained ML model for the second captured image is used as a prior constraint to the first trained ML model for generation of a second alpha matte for the third captured image; and perform a second alpha-aware graphical processing operation on the third captured image according to the second alpha matte.

10. The non-transitory computer readable medium of claim 8, wherein the first type of object comprises a particular domain of objects, and wherein the first trained ML model is trained to recognize the particular domain of objects in an image.

11. The non-transitory computer readable medium of claim 8, wherein the first captured image and the second captured image are captured at different times.

12. The non-transitory computer readable medium of claim 8, wherein the first captured image is captured by a first one of the one or more image capture devices and the second captured image is captured by a second one of the one or more image capture devices.

13. The non-transitory computer readable medium of claim 8, wherein the second frame rate is greater than the first frame rate.

14. The non-transitory computer readable medium of claim 8, wherein the first alpha matte comprises a plurality of pixels having continuous confidence values, and wherein higher confidence values represent a higher level of confidence that a given pixel reflects a presence of the first type of object in the scene.

15. An image processing method, comprising:

obtaining a first captured image of a scene from one image capture device of one or more image capture devices, wherein the first captured image of the scene is obtained from a first image capture stream having a first frame rate;

obtaining a binary segmentation mask for the first captured image of a scene, wherein the binary segmentation mask has a first resolution and segments out at least a first type of object from an image;

obtaining a second captured image of the scene from one of the one or more image capture devices, wherein the second captured image of the scene is obtained from a second image capture stream having a second frame rate, and wherein the second captured image has a second resolution that is greater than the first resolution;

downscaling a version of the second captured image to the first resolution;

feeding the binary segmentation mask and the version of the second captured image that is downscaled to the first resolution as inputs to a first trained machine learning (ML) model, wherein at least one output from the first trained ML model for a previously-processed image is used as a prior constraint for generation of an alpha matte for a captured image the first trained ML model is currently processing, wherein an output of the first trained ML model comprises a first alpha matte generated for the second captured image, wherein the first alpha matte has the first resolution, and wherein values in the first alpha matte are indicative of the first trained ML model's confidence level in whether a corresponding portion of the second captured image comprises the first type of object;

upscaling the first alpha matte from the first resolution to the second resolution; and performing a first alpha-aware graphical processing operation on the second captured image according to the upscaled first alpha matte.

16. The method of claim 15, further comprising:

obtaining a third captured image of the scene, wherein the third captured image has the second resolution and is captured subsequently to the second captured image;

downscaling a version of the third captured image to the first resolution;

feeding the binary segmentation mask and the version of the third captured image that is downscaled to the first resolution as input to the first trained ML model, wherein at least one output from the first trained ML model for the second captured image is used as a prior constraint to the first trained ML model for generation of a second alpha matte for the third captured image; and performing a second alpha-aware graphical processing operation on the third captured image according to the second alpha matte.

17. The method of claim 15, wherein the first type of object comprises a particular domain of objects, and wherein the first trained ML model is trained to recognize the particular domain of objects in an image.

18. The method of claim 15, wherein the first captured image and the second captured image are captured at different times.

19. The method of claim 15, wherein the second frame rate is greater than the first frame rate.

20. The method of claim 15, wherein the first alpha matte comprises a plurality of pixels having continuous confidence values, and wherein higher confidence values represent a higher level of confidence that a given pixel reflects a presence of the first type of object in the scene.

* * * * *